United States Patent [19]
Giampavolo et al.

[11] Patent Number: 6,101,690
[45] Date of Patent: Aug. 15, 2000

[54] STRAP RETAINER FOR CHILD SEATBELTS

[75] Inventors: Paul F. Giampavolo, Milton, N.H.; John S. Pontaoe, Chicago, Ill.

[73] Assignee: Illinois Tool Works Inc., Glenview, Ill.

[21] Appl. No.: 09/410,539

[22] Filed: Oct. 1, 1999

[51] Int. Cl.[7] .................................................. A44B 21/00
[52] U.S. Cl. ..................... 24/598.2; 24/573.5; 24/16 PB; 24/265 AL
[58] Field of Search ........................... 24/573.5, 265 AL, 24/265 BC, 16 PB, 598.2, 601.2, 702, 669, 335, 336, 339, 171, 614, 615; 70/457

[56] References Cited

U.S. PATENT DOCUMENTS

| | | | |
|---|---|---|---|
| 5,263,726 | 11/1993 | Wood | 280/33.992 |
| 5,669,118 | 9/1997 | Frano et al. | |
| 5,781,970 | 7/1998 | Anscher | 24/573.5 |
| 5,920,968 | 7/1999 | Anscher | 24/598.2 |
| 5,940,944 | 8/1999 | Anscher | 24/598.2 |

*Primary Examiner*—Anthony Knight
*Assistant Examiner*—Robert J. Sandy
*Attorney, Agent, or Firm*—Pitney, Hardin, Kipp & Szuch LLP

[57] ABSTRACT

The strap retainer includes a relatively rigid post element with one end formed integrally with a relatively flexible strap element. The free end of the post element includes parallel stabilizing channels and a central detent channel which receive parallel stabilizing prongs and a central detent channel on the free end of the strap element. The detent channel includes detent protrusions with forward ramps to deflect the detent prong upon initial insertion, and further includes rearward ramps to detent engage lateral ramped surfaces on the detent prong after the detent prong has ramped over the detent protrusions and returned to an undeflected position.

5 Claims, 2 Drawing Sheets

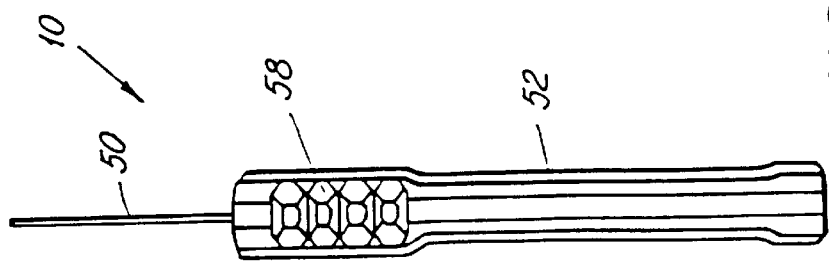
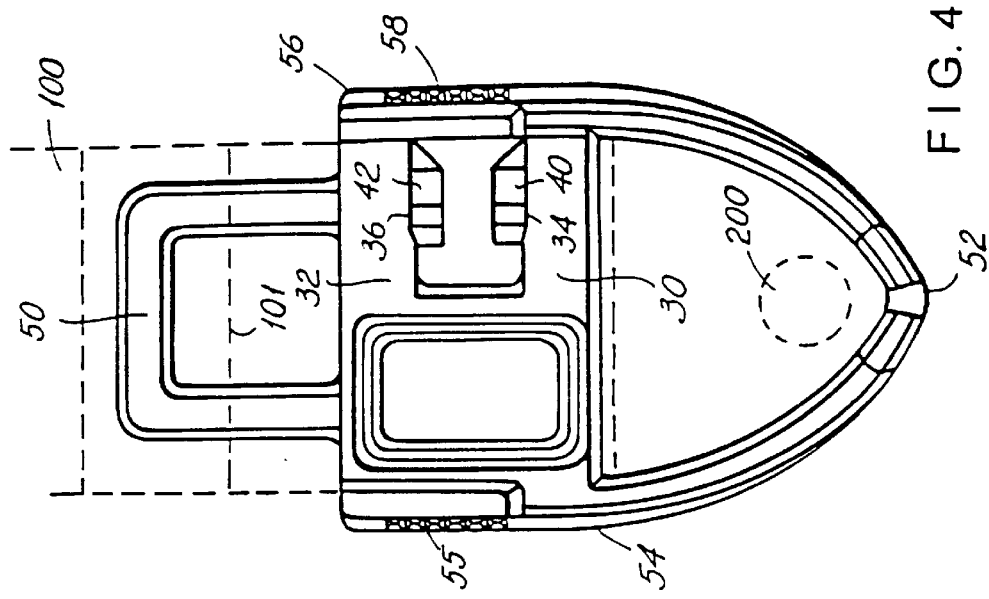
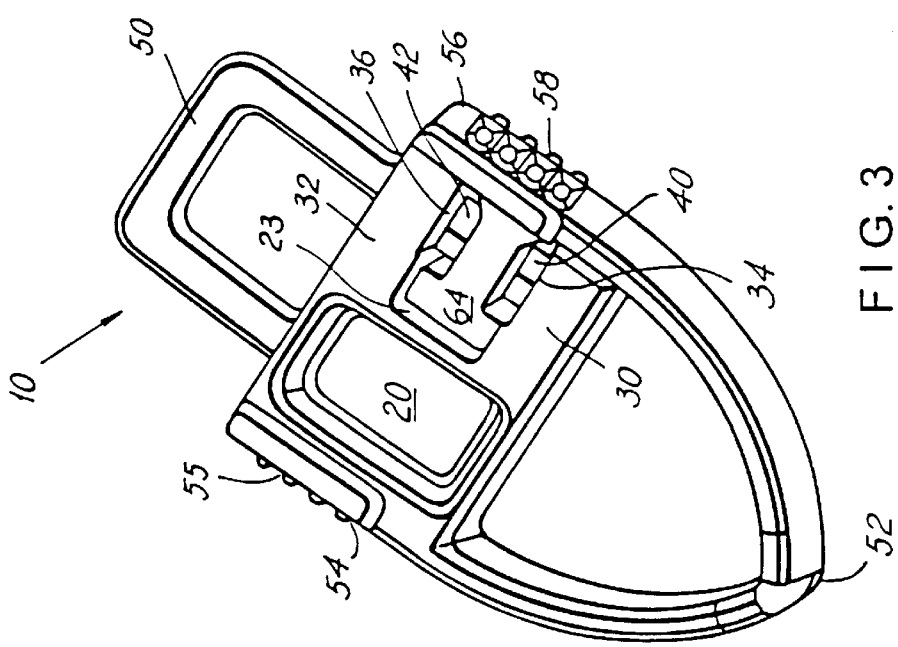

STRAP RETAINER FOR CHILD SEATBELTS

BACKGROUND OF THE INVENTION

1. Field of the Invention

This invention pertains to a strap retainer, such as is used to secure a child seatbelt to a shopping cart and for other similar applications.

2. Description of the Prior Art

In the prior art, it is well-known to secure a nylon seatbelt-type child restraint apparatus to grocery cart of similar vehicle to assure the safety of children riding in the shopping cart. It is imperative that such devices are securely attached to the shopping cart without the reasonable possibility of becoming accidentally disattached. An example of a seatbelt or safety strap for such an application is shown in U.S. Pat. No. 5,263,726 entitled "Child Restraint Strap for a Shopping Cart Seat", issued on Nov. 23, 1993 to Wood.

However, the attachment of the seatbelt to the carriage is critical in several respects. The nylon web of the belt cannot rub against metallic parts, such as the carriage or the attachment devices, as this may lead to tearing and failure of the nylon web. This concern makes such attachment devices as metallic rings (e.g. keyring-type structures) and grommets undesirable. Additionally, the attachment devices must be simple and foolproof to install, preferably with no tools required on-site. The attachment devices must have no credible possibility of accidental disengagement. The attachment devices should have no exposed locking components which could be tampered with to the detriment of the attachment. Similarly, any exposed locking components frequently provide crevices into which food, dirt, and similar material can accumulate.

U.S. Pat. No. 5,669,118 entitled "Strap Retainer" and issued on Sep. 23, 1997 to Frano, Giampavolo and Sipp has provided a device which has been quite satisfactory in many respects, but improvement is desired.

OBJECTS AND SUMMARY OF THE INVENTION

It is therefore an object of this invention to provide an attachment device or strap retainer for a child seatbelt which attaches the seatbelt securely and permanently to a grocery cart or similar device.

It is therefore a further object of this invention to provide an attachment device or strap retainer for a child seatbelt wherein the web of the child seatbelt will not rub against metal parts at the point of attachment to the grocery cart of similar device.

It is therefore a still further object of this invention to provide an attachment device or strap retainer for a child seatbelt which is simple and foolproof to install.

It is therefore a still further object of this invention to provide an attachment device or strap retainer for a child seatbelt which can be installed on-site with no tools.

It is therefore a still further object of this invention to provide an attachment device or strap retainer for a child seatbelt which exposes a minimum of locking components and/or crevices in the installed position.

It is therefore a final object of this invention to provide an attachment device or strap retainer for a child seatbelt which is resistant to tampering.

These and other objects are attained by an attachment device or strap retainer which is made of plastic and includes a relatively stiff post element with an integral lateral sew-tab. The nylon web of the seatbelt is looped around the post element and is typically sewed to the sew-tab prior to shipment to the site of installation. A first end of a flexible looping element is formed integrally with a first end of the post element. The second end of the flexible looping element includes two parallel stabilizing prongs and a central detent prong. The second end of the post element includes two longitudinal stabilizing channels and central detent channel for receiving the two respective parallel stabilizing prongs and central detent prong. The central detent prong includes lateral ramped wings to detent engage complementary ramped detent surfaces within the central detent channel thereby joining the flexible looping element at both ends to respective ends of the post element. A portion of the shopping cart or similar vehicle is typically engaged therewithin.

BRIEF DESCRIPTION OF THE DRAWINGS

Further objects and advantages of the invention will become apparent from the following description and claims, and from the accompanying drawings, wherein:

FIG. 3 is a perspective view of the strap retainer of the present invention in a closed or locked position.

FIG. 4 is a plan view of the strap retainer of the present invention in a closed or locked position, with the nylon web of a seatbelt or similar device and the cross section of the wire of the engaged shopping cart shown in phantom.

FIG. 5 is a side plan view of the strap retainer of the present invention in a closed or locked position.

DETAILED DESCRIPTION OF THE PREFERRED EMBODIMENT

Figure 1:
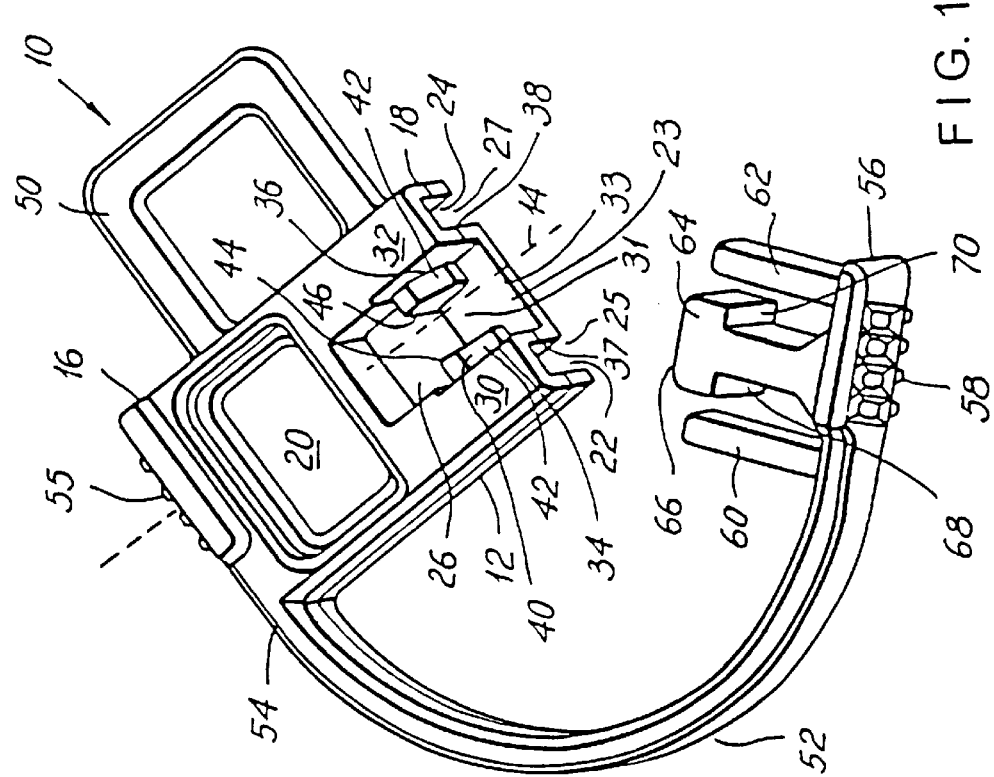
FIG. 1 is a perspective view of the strap retainer of the present invention in an open or unlocked position.

Referring now to the drawings in detail wherein like numerals refer to like elements throughout the several views, one sees that FIG. 1 is a perspective view of the strap retainer 10 of the present invention in an open or unlocked position. Strap retainer 10 is integrally formed from molded plastic and includes post element 12 which is relatively stiff. Post element 12 is formed along longitudinal axis 14 includes first end 16 and second end 18. Transverse cored-out passageway 20 is formed inwardly adjacent from first end 16 of post element 12. Parallel stabilizing channels 22, 24 are formed on second end 18 of post element 12 and extend inwardly parallel to longitudinal axis 14. Central detent channel 23 is formed between parallel stabilizing channels 22, 24 and likewise extends inwardly parallel to longitudinal axis 14. Parallel stabilizing channels 22, 24 include open sides 25, 27 which are oppositely oriented to open side 26 of central detent channel 23. In other words, in the orientation shown in FIG. 1, open side 26 faces upwardly and open sides 25, 27 face downwardly. Parallel stabilizing channels 22, 24 include closed sides 30, 32 oppositely oriented to open sides 25, 27. In other words, in the orientation shown in FIG. 1, closed side 30, 32 are upwardly oriented. Wall 31 extends between open sides 25, 27 thereby forming partially closed side 33 of central detent channel 23 opposite from open side 26 of central detent channel 23. Partially closed side 33 faces downwardly. Wall 31 includes a detent configuration formed by detent protrusions 34, 36. Detent protrusions 34, 36 are further formed on walls 37, 38 which separate central detent channel 23 from parallel stabilizing channels 22, 24. Detent protrusions 34, 36 include forward ramps 40, 42 which deflect complementary detent elements (to be described hereinafter) inserted into central detent channel 23 and rearward ramps 44, 46 which engage complementary detent elements after insertion into central detent channel 23 past detent protrusions 34, 36.

Sew-tab 50 is formed laterally to post element 12 and cored-out. As shown in FIG. 4, sew-tab 50 is used to sew nylon web 100 to itself along seam 101 after being looped around post element 12. This provides for strap retainer 10 and nylon web 100 (in phantom in FIG. 4) to be provided as a single piece and further prevents nylon web 100 from rubbing against the metal wire 200 of a shopping cart or similar structure (see FIG. 4).

Figure 2:
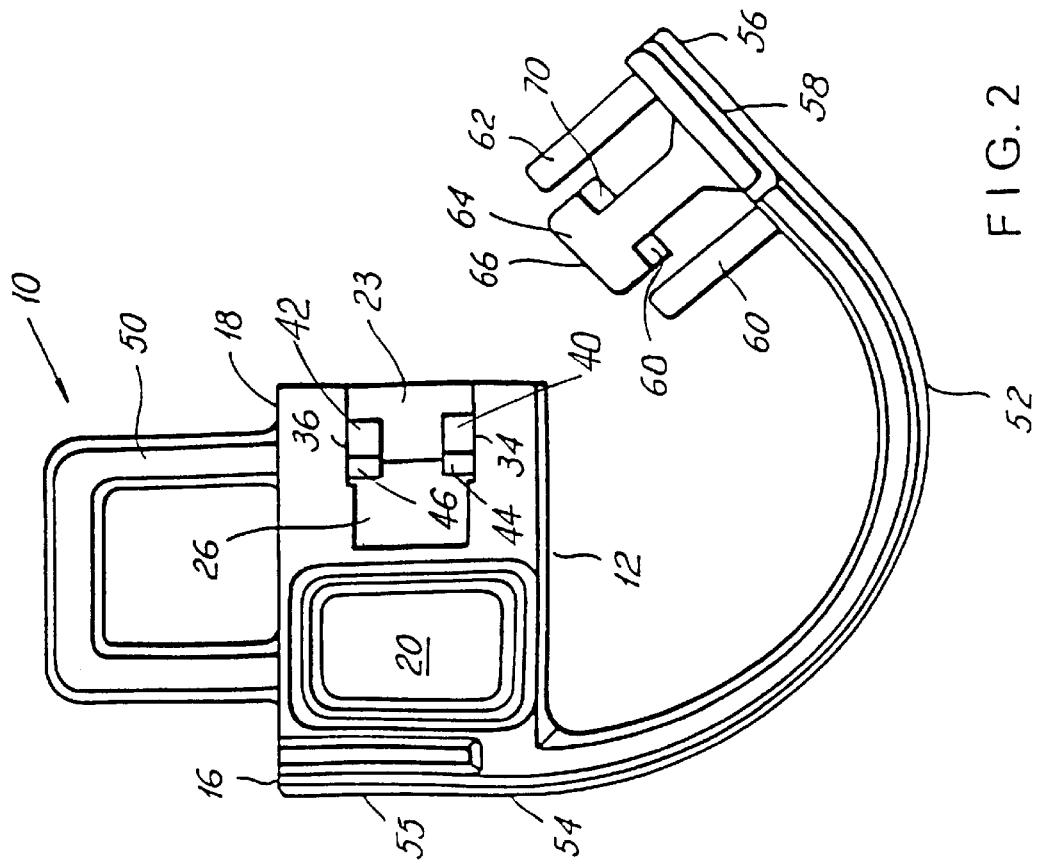
FIG. 2 is a plan view of the strap retainer of the present invention in an open or unlocked position.

Flexible strap 52 includes a first end 54 and a second end 56. First end 54 is integral with first end 16 of post element 12. External ribs 55 (see FIG. 2) are formed along first end 16 of post element 12 at the intersection of first end 54 of flexible strap 52. External ribs 55 are for user gripping purposes. Similarly, second end 56 of flexible strap 52 includes external ribs 58. Additionally, parallel stabilizing prongs 60, 62 and central detent prong 64 are formed on second end 56 of flexible strap 52. Central detent prong 64 includes front ramped surface 66 and lateral detent ramped surfaces 68, 70.

To achieve the locked position of strap retainer 10 as shown in FIGS. 3 and 4, stabilizing prongs 60, 62 and central detent prong 64 are inserted into parallel stabilizing channels 22, 24 and central detent channel 23, respectively. As front ramped surface 66 of central detent prong 64 engages forward ramps 40, 42 of detent protrusions 34, 36 during the insertion of central detent prong 23 into central detent channel 23, central detent prong 64 deflects upwardly allowing front ramped surface 66 of central detent prong 64 to ride over detent protrusions 34, 36. However, stabilizing prongs 60, 62 within stabilizing channels 22, 24 inhibit lateral deflection of second end 56 of flexible strap 52. After front ramped surface 66 of central detent prong 64 rides over detent protrusions 34, 36, central detent prong 64 snaps back into alignment with longitudinal axis 14 thereby causing lateral detent ramped surfaces 68, 70 to detent engage rearward ramps 44, 46.

The flexible strap 52 thereby engages the wire 200 of the shopping cart or similar vehicle.

As shown in FIG. 4, the resulting locked position, particularly with the nylon web 100 looped around strap retainer 10, has no exposed locking elements and very little in the way of exposed crevices.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A strap retainer including:

a post element formed along a longitudinal axis with a first post end and a second post end;

a strap element with a first strap end and a second strap end;

said first post end being affixed to said first strap end;

said second post end including a detent channel extending parallel to said longitudinal axis;

said detent channel including a first detent element including at least one detent protrusion;

said second strap end including a detent prong including a second detent element with lateral detent ramped surfaces;

said at least one detent protrusion including a forward ramp for deflecting said detent prong during initial insertion of said detent prong into said detent channel, and further including a rearward ramp for detent engaging said second detent element of said detent prong;

said detent prong including a front ramped surface allowing said detent prong to ramp over said forward ramp during initial insertion of said detent prong into said detent channel;

at least one stabilizing prong parallel to said detent prong;

at least one stabilizing channel, parallel to said detent channel, for receiving said at least one stabilizing prong; and whereby when said detent prong is inserted into said detent channel, said first detent element detent engages said second detent element.

2. The strap retainer of claim 1 wherein said at least one stabilizing prong within said at least one stabilizing channel inhibits lateral deflection of said second strap end as said detent prong ramps over said forward ramp and further urges said detent prong into an undeflected detent position after said detent prong ramps over said forward ramp.

3. The strap retainer of claim 2 wherein said detent prong is formed between two stabilizing prongs and is parallel thereto, and wherein said detent channel is formed between two stabilizing channels and is parallel thereto.

4. The strap retainer of claim 3 wherein said detent channel opens to a first side of said post element and said stabilizing channels open to a second side of said post element, said first side being opposite to said second side.

5. The strap retainer of claim 4 further including a relatively planar portion formed laterally outwardly from said post element.

* * * * *